US012501107B2

(12) United States Patent
Herman et al.

(10) Patent No.: US 12,501,107 B2
(45) Date of Patent: Dec. 16, 2025

(54) STREAMLINING COMMUNICATIONS IN A CLASSIFIED ENVIRONMENT

(71) Applicant: Palantir Technologies Inc., Denver, CO (US)

(72) Inventors: Hunter Herman, Palo Alto, CA (US); Nikhil Chari, Philadelphia, PA (US); Peter Wilczynski, Denver, CO (US); Vineel Kodikanti, Honolulu, HI (US); Eugene Robinson, London (GB)

(73) Assignee: Palantir Technologies Inc., Denver, CO (US)

( * ) Notice: Subject to any disclaimer, the term of this patent is extended or adjusted under 35 U.S.C. 154(b) by 209 days.

(21) Appl. No.: 18/106,426

(22) Filed: Feb. 6, 2023

(65) Prior Publication Data

US 2024/0179369 A1    May 30, 2024

Related U.S. Application Data

(60) Provisional application No. 63/428,304, filed on Nov. 28, 2022.

(51) Int. Cl.
*H04N 21/23* (2011.01)
*H04N 21/2385* (2011.01)
*H04N 21/438* (2011.01)
*H04N 21/4788* (2011.01)

(52) U.S. Cl.
CPC ..... *H04N 21/4383* (2013.01); *H04N 21/2385* (2013.01); *H04N 21/4788* (2013.01)

(58) Field of Classification Search
None
See application file for complete search history.

(56) References Cited

U.S. PATENT DOCUMENTS

| 2016/0105463 | A1 | 4/2016 | Stuntebeck et al. |
| 2022/0358191 | A1 | 11/2022 | Balmakhtar et al. |
| 2024/0097925 | A1 * | 3/2024 | Palamadai ............. H04N 7/152 |

FOREIGN PATENT DOCUMENTS

| EP | 2341686 A1 * | 7/2011 | ........... H04L 63/104 |
| EP | 2341686 B1 | 8/2016 | |
| EP | 3055949 A1 * | 8/2016 | ............. H04L 63/00 |
| EP | 3055949 B1 | 11/2018 | |

OTHER PUBLICATIONS

Extended European Search Report dated Jan. 11, 2024, issued in related European Patent Application No. 23212399.2 (8 pages).

* cited by examiner

*Primary Examiner* — Cai Y Chen
(74) *Attorney, Agent, or Firm* — Sheppard Mullin Richter & Hampton LLP

(57) ABSTRACT

Computing systems methods, and non-transitory storage media are provided for receiving an indication to instantiate an audio or video communication channel, among computing devices, within an application, an artifact, or a resource, obtaining an access control attribute associated with the application, the artifact, or the resource, and instantiating the audio or video communication channel among the computing devices according to the access control attribute.

19 Claims, 12 Drawing Sheets

STREAMLINING COMMUNICATIONS IN A CLASSIFIED ENVIRONMENT

CROSS-REFERENCE TO RELATED APPLICATION

This application claims the benefit under 35 U.S.C. 119(e) of U.S. Provisional Application No. 63/428,304, filed Nov. 28, 2022, the content of which is hereby incorporated in its entirety.

FIELD OF THE INVENTION

This disclosure relates to approaches of augmenting communications within an artifact or resource in a classified environment.

BACKGROUND

In a classified environment, existing video and audio communication solutions are largely inadequate due to excessive time, number of applications and/or amount of resources to instantiate a communication channel, and instability of communication signal or quality. By leveraging an existing platform within the classified environment and artifacts, applications, or resources therein, video and audio communications may be streamlined and more effective.

SUMMARY

Various examples of the present disclosure can include computing systems, methods, and non-transitory computer readable media configured to perform: receiving an indication to instantiate an audio or video communication channel, among computing devices, within an application, an artifact, or a resource; obtaining an access control attribute associated with the application, the artifact, or the resource; instantiating the audio or video communication channel among the computing devices according to the access control attribute.

In some examples, the access control attribute comprises a first access control attribute, and the instantiating of the audio or video communication channel comprises embedding the audio or video communication channel within the application, the artifact, or the resource across different instances of the application, the artifact, or the resource, and setting a second access control attribute corresponding to the audio or video communication channel to match the first access control attribute.

In some examples, the instantiating of the audio or video communication channel comprises embedding the audio or video communication channel within the application, the artifact, or the resource across different instances of the application, the artifact, or the resource, and setting a second access control attribute corresponding to the audio or video communication channel according to an intersection among different access control attributes of the respective different instances.

In some examples, the setting of the second access control attribute corresponding to the audio or video communication channel is according to a maximum access control attribute that is equally or less restrictive compared to each of the different access control attributes of the respective different instances.

In some examples, the application, the artifact, or the resource comprises a chat channel.

In some examples, the different instances are deployed across different servers, and the instantiation of the audio or video communication channel is across the different servers.

In some examples, the instructions that, when executed by the one or more processors, further cause the system to perform: sharing respective screens of one or more of the computing devices to other computing devices within the audio or video communication channel.

These and other features of the computing systems, methods, and non-transitory computer readable media disclosed herein, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings. Any principles or concepts illustrated in one figure may be applicable to any other relevant figures. For example, principles illustrated in FIGS. 1A-1E may also be applicable to any of FIGS. 2A-2B, 3, and 4, and vice versa.

DETAILED DESCRIPTION

Figure 1A:
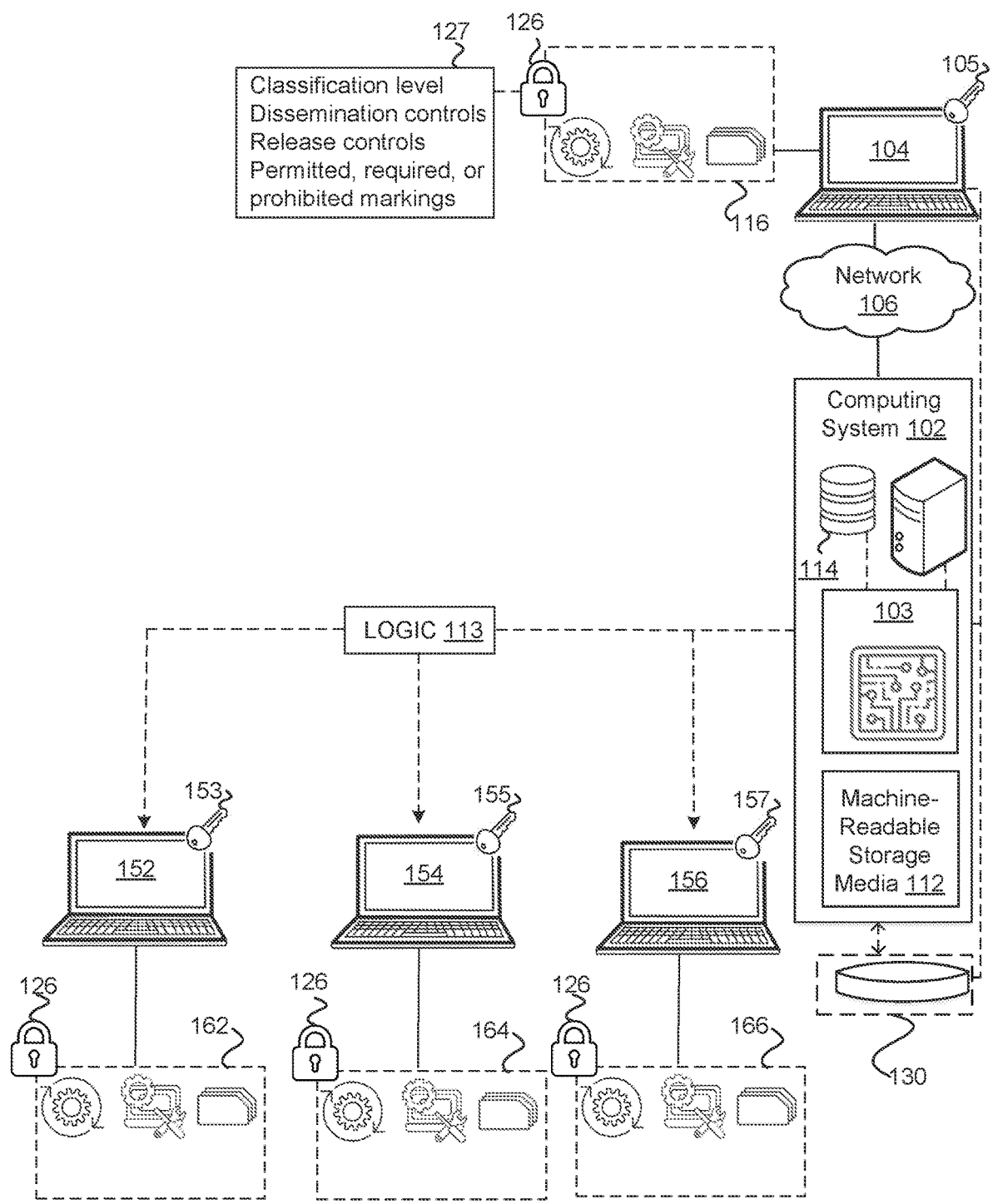
FIGS. 1A-1E illustrate an example implementation of a computing system that instantiates a video or audio communications channel, embedded within an application, artifact, or resource, without separately instantiating or commencing a video or audio communications channel.

Within secured and/or classified environments or networks (hereinafter "environments"), audio and video communications has been hampered by bottlenecks such as an excessive time, number of applications and/or amount of resources to instantiate a communication channel, and instability of communication signal or quality. The dearth of such communications solutions within a secured computing environment has been a conundrum. As will be described in the foregoing FIGURES, an improved audio and video communication mechanism within secured computing environments may encompass instantiating video and audio communications channels within a particular artifact, application, or resource (hereinafter "resource"). Therefore, access control restrictions within the video and audio communications channels may inherit classification parameters or restrictions of the particular artifact, application, or resource. Additionally, instantiating the video and audio communications channels within a particular resource may obviate a requirement of loading a separate application for video and audio communications.

In some examples, a secured and/or classified environment or network may encompass a classification backed access control (CBAC) security architecture. As one facet of the CBAC security architecture, different classification levels may include "top secret," "secret," "classified," and "unclassified." Alternatively, different classification levels may include "highly sensitive," "sensitive," "internal," and "public." The classification levels may be defined for resources or servers as well as computing devices or users. For a resource or server, a classification level indicates a maximum classification of data within that resource or server. For example, a resource or server having a classification level of "secret" means that data classified at a "top secret" level is prohibited from the resource or secret, but data having a classification level of "secret," "classified," or "unclassified" is permitted within the resource or server. Additionally, the classification level of the resource or server also indicates a minimum classification of a computing device or user required to access the resource or server. For example, a resource or server having a classification level of "secret" means that a user or corresponding computing device having a classification of "secret" or "top secret" is permitted to access the resource or server, but that a user or corresponding computing device having a classification of "classified" or "unclassified" is prohibited from accessing the resource or server.

Other facets of the CBAC security architecture may encompass dissemination, releasability, and/or required, permitted or prohibited markings within a resource or server. Dissemination may stipulate that conditions and/or restrictions of distribution of data within the resource or server, such as, that distribution of data is for a particular purpose and/or with approval from an authorized entity. Meanwhile, releasability may define specific characteristics of entities to which data within the resource or server are permitted to be released. For example, a resource or server having a releasability condition of "releasable to United States" means that data within the resource or server may be releasable to entities and/or computing devices within the United States, but may be prohibited from being released to entities and/or computing devices outside of the United States. Lastly, required, permitted or prohibited markings may indicate markings or tags within data that are required, permitted or prohibited from being ingested or imported into the resource or server. For example, a required marking of "A" means that any data ingested within the resource or server has a marking of "A," while data without a marking of "A" is prohibited from being ingested within the resource or server. A permitted marking of "A" means that any data having a marking of "A" is permitted to be ingested within the resource or server. However, data having other markings besides "A" may be prohibited from being ingested within the resource or server. A prohibited marking of "A" means that any data having a marking of "A" is prohibited from being ingested within the resource or server.

FIG. 1A illustrates an example implementation or scenario (hereinafter "implementation") 100, of a computing system 102 that improves audio and video communications within a secured computing environment. The implementation 100 can include at least one computing device 104 which may be operated by an entity such as a user. The computing device 104 may include one or more processors and memory. The user may submit a request, query, or indication (hereinafter "indication") through the computing device 104. Such a request or query may relate to a request, query, or indication to commence or instantiate a video or audio communications channel within an instance of a particular resource. Such a resource may encompass, without limitation, a data analysis resource, a data storage resource, a data visualization resource, a map or geospatial resource, or a communications resource such as a chat channel. The computing device 104 may submit the indication over a network 106, for example, through one or more graphical user interfaces, application programming interfaces (APIs), and/or webhooks, to the computing system 102. In other examples, the computing system 102 may, without any input or indication from the computing device 104, automatically instantiate a video or audio communications channel when certain conditions are met. These conditions may include a threshold number of computing devices collaborating on instances of a common resource, a threshold frequency of access or modifications on the common resource, and/or a threshold amount of data accessed or transferred within the common resource.

The computing system 102 may include one or more processors 103 which may be configured to perform various operations by interpreting machine-readable instructions, for example, from a machine-readable storage media 112. In some examples, one or more of the processors 103 may be combined or integrated into a single processor, and some or all functions performed by one or more of the hardware processors 103 may not be spatially separated, but instead may be performed by a common processor. The processors 103 may be physical or virtual entities. For example, as virtual entities, the processors 103 may be encompassed within, or manifested as, a program within a cloud environment. The processors 103 may constitute separate programs or applications compared to the machine learning components. The computing system 102 may also include a storage 114, which may include a cache for faster access compared to a database 130. For example, the storage 114 and/or the database 130 may store logs of audio and/or video communication channels that were instantiated and/or records of communications among different computing devices within the audio and/or video communication channels, which may include timestamps and/or time ranges.

The hardware processors 103 may further be connected to, include, or be embedded with logic 113 which, for example, may include protocol that is executed to carry out the functions of the hardware processors 103. In general, the logic 113 may be implemented, in whole or in part, as software that is capable of running on the computing system 102, and may be read or executed from the machine-readable storage media 112. The logic 113 may include, as nonlimiting examples, parameters, expressions, functions, arguments, evaluations, conditions, and/or code. Here, in some examples, the logic 113 encompasses and/or executes functions of or related to instantiating an audio or video communications channel among different computing devices operating on a common resource within a platform, such that the audio or video communications channel is embedded within the common resource, rather than opening a separate application for the audio or video communications channel. Functions or operations described with respect to the logic 113 may be associated with a single processor or multiple processors.

The logic 113 may be configured to perform instantiation of an audio or video communication channel embedded within a resource. In FIG. 1A, the computing device 104, and additional computing devices 152, 154, and 156 may be accessing instances 116, 162, 164, and 166, respectively, of a common resource within a platform. The computing device 104, and the additional computing devices 152, 154, and 156 may be accessing the instances 116, 162, 164, and 166 from common servers or different servers. Although four computing devices are illustrated in FIG. 1A, any number of computing devices may be accessing or connected to a common resource simultaneously. The logic 113 may either receive an indication from any of the computing device 104 or the additional computing devices 152, 154, and 156 to commence or instantiate a communications channel. In some examples, alternatively, the logic 113 may automatically instantiate an audio or video communications channel among different computing devices accessing a common resource. In some examples, the logic 113 may determine whether to instantiate an audio or video communications channel without prompting or input by a computing device, based on whether certain conditions are met. These conditions may include a threshold number of computing devices collaborating on instances of a common resource, a threshold frequency of access or modifications on the common resource, and/or a threshold amount of data accessed or transferred within the common resource.

The instances 116, 162, 164, and 166 illustrated in FIG. 1A may have common access control characteristics or parameters (hereinafter "characteristics") 126. The access control characteristics 126 may encompass any of classification level, dissemination controls, release controls, and permitted, required, and/or prohibited markings, as indicated by settings 127. For example, if the access control characteristics 126 indicate a classification level of "secret," then any computing device, entity, or user having at least a classification level of "secret," which includes "secret" and "top secret," may be permitted to access the instances 116, 162, 164, and 166. However, any computing device, entity, or user having a classification level of "classified" or "unclassified" may be prohibited from accessing the instances 116, 162, 164, and 166. Each of the instances 116, 162, 164, and 166 may be deployed on a server that has access control characteristics which meet or exceed levels of the access control characteristics 126. For example, if the access control characteristics 126 indicate a classification level of "secret," then the instances 116, 162, 164, and 166 are to be deployed on one or more servers that each have a classification level of at least "secret," meaning, "secret" or "top secret." Each of the computing devices 104, 152, 154, and 156 may also have, or be associated with, access control privileges 105, 153, 155, and 157, which satisfy (e.g., meet or exceed) the access control characteristics 126.

The logic 113 instantiates any audio or video communications channel within the common resource, meaning that the audio or video communications channel automatically inherits access control characteristics of the underlying or parent common resource. As a result, granular access control permissions on individual resources such as mapping applications, reports, presentations, and chat functions may be intertwined with, propagated, and/or replicated to audio and video communications. Such a solution facilitates cohesive collaboration among users having different access permissions, locations, and/or nationalities, without having to launch a separate audio or video communications application.

Figure 1B:
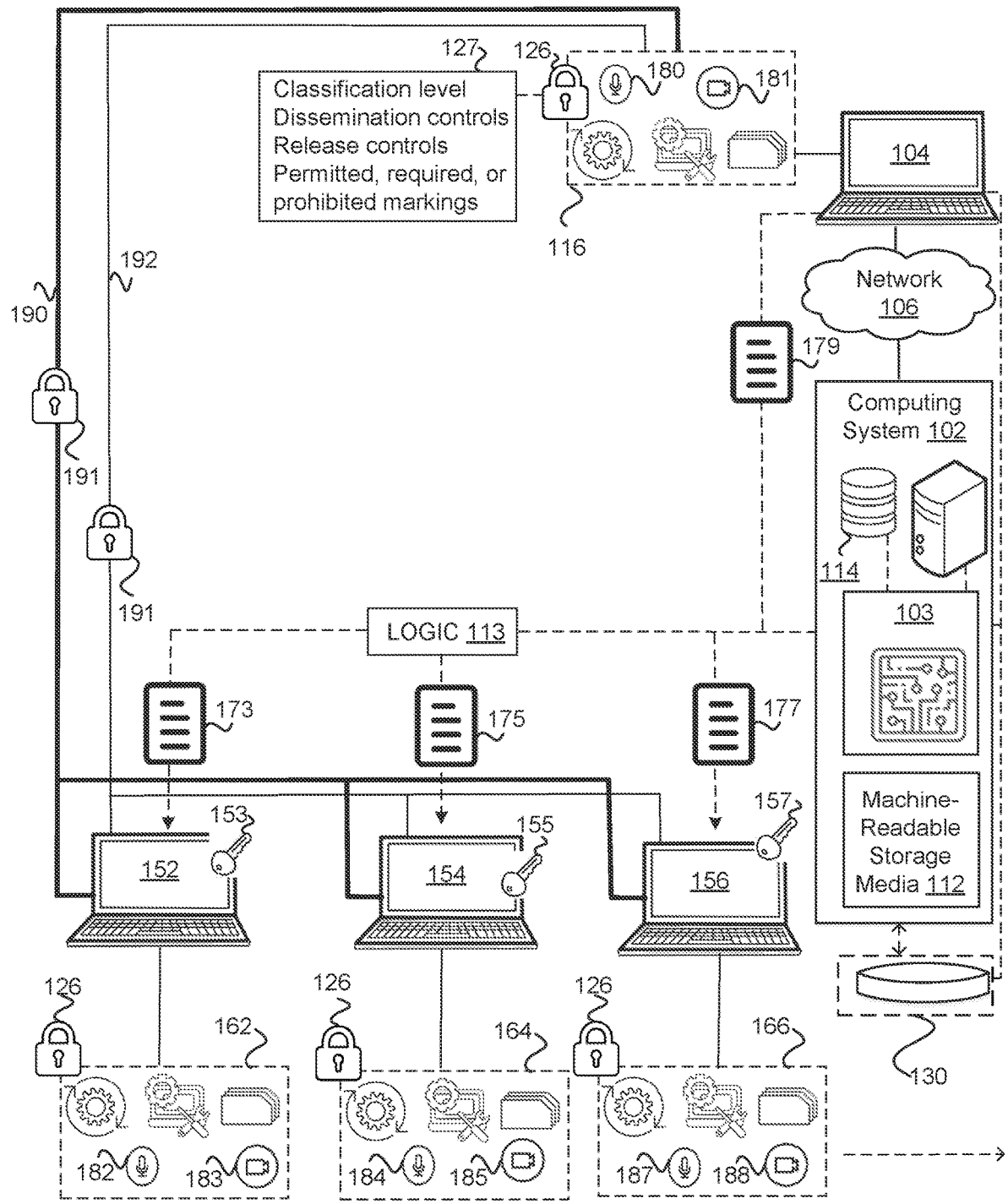
Figure 1B:
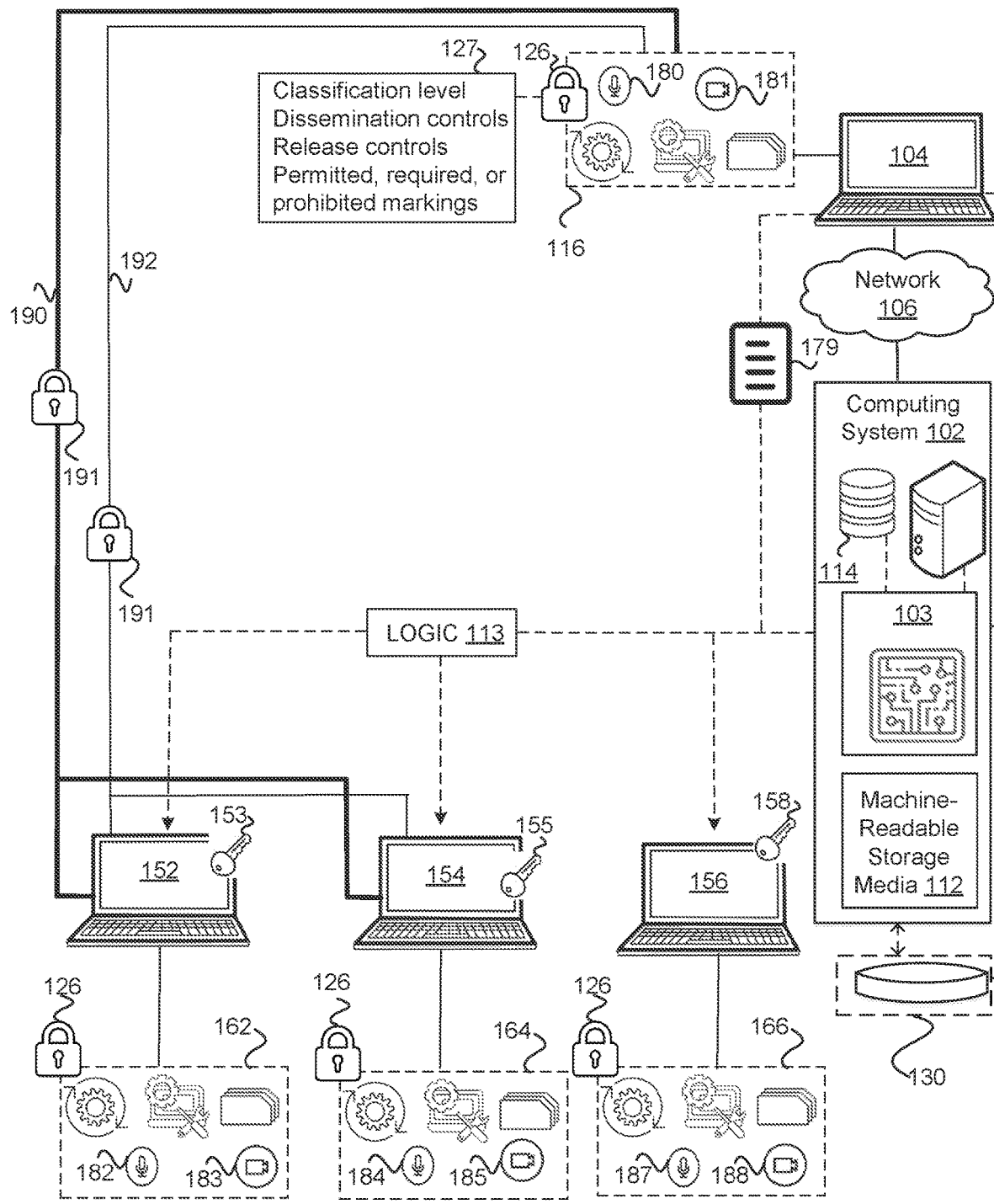

FIG. 1B illustrates that the logic 113 instantiates an audio or video communications channel 190 within the common resource that the computing device 104 and the additional computing devices 152, 154 and 156 are deploying or collaborating. In particular, the common resource may have or be associated with access control characteristics 191, which may match the access control characteristics 126 of the instances 116, 162, 164, and 166 of the underlying or parent resource. The logic 113 may transmit packets 173, 175, 177, and/or 179 to the additional computing devices 152, 154, and 156, and the computing device 104, respectively, to indicate a successful establishment or connection to the audio or video communications channel 190. In an event that the communication channel 190 fails, the logic 113 may activate, open, instantiate, or deploy tunnels 192 among the computing device 104 and the additional computing devices 152, 154 and 156 as a backup communication path. The tunnels may also have or be associated with the access control characteristics 191.

In some examples, if any of the computing devices 104, 152, 154, and 156 changed access control privileges, then the logic 113 may evaluate whether the changed access control privileges still satisfy the access control characteristics 191. If not, then that computing device may be removed from the audio or video communications channel 190 and from an instance of the resource. For example, if the access control characteristics 191 specify that any user or computing device accessing the audio or video communications channel 190 is to have at least a classification level of "top secret," then if a computing device had access control privileges changed from "top secret" to "secret," then that computing device may be removed from the audio or video communications channel 190 because that computing device no longer satisfies the minimum classification level of "top secret." This principle is also illustrated in the example of FIG. 1B, in which the additional computing device 156 has its access control privileges 157 changed to access control privileges 158, which no longer satisfy (e.g., meet minimum specifications, standards, or requirements) of the access control characteristics 191, then the additional computing device 158 may be removed from the audio or video communications channel 190.

In some examples, if any other computing devices had their access control privileges promoted, for example, from "secret" to "top secret," and/or commenced accessing the common resource after the initial instantiation of the audio or video communications channel 190, then those other computing devices may receive an indication or packet indicating that they are authorized to connect to the audio or video communications channel 190.

Figure 1C:
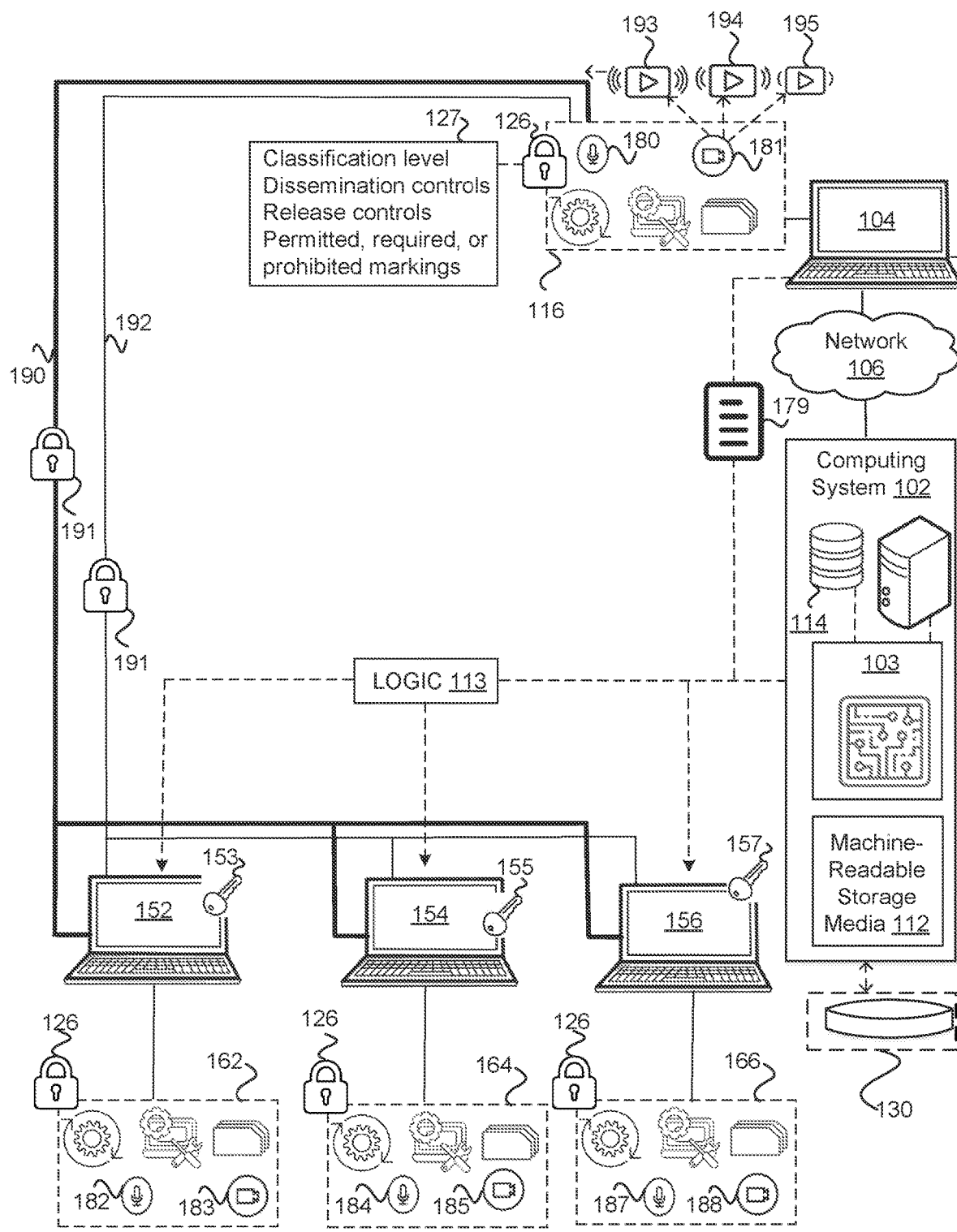

In some examples, each of the computing device 104 and the additional computing devices 152, 154, and 156 may generate multiple video streams, each of which correspond to different levels of quality as indicated by number of pixels and/or resolutions, as illustrated, for example, in FIG. 1C. For example, each of the computing device 104 and the additional computing devices 152, 154, and 156 may generate video streams having 360 pixels, 720 pixels, and/or 1080 pixels. In some examples, the logic 113 may transmit or route each of the multiple video streams to other computing devices besides the computing device that generated the multiple video streams. For example, for the multiple video streams generated by the computing device 104, the logic 113 may transmit the multiple video streams to the additional computing devices 152, 154, and 156. In other examples, alternatively, the logic 113 may only transmit or route a subset or portion of the multiple video streams to the other computing devices, such as, a single video stream having a quality that matches attributes of the additional computing devices 152, 154, and 156. Additionally or alternatively, each of the multiple video streams may encompass multiple layers, in which each of the layers correspond to different resolutions and/or bitrates. Thus, a single video stream may be adjusted to match attributes of each of the computing devices, which obviates the need to encode and decode the streams for each of different computing devices. Additionally, the logic 113 and/or a receiving computing device may adjust quality of service (QoS) of the video or audio stream, which may include parameters such as bandwidth, delay, loss, and/or jitter.

Figure 1D:
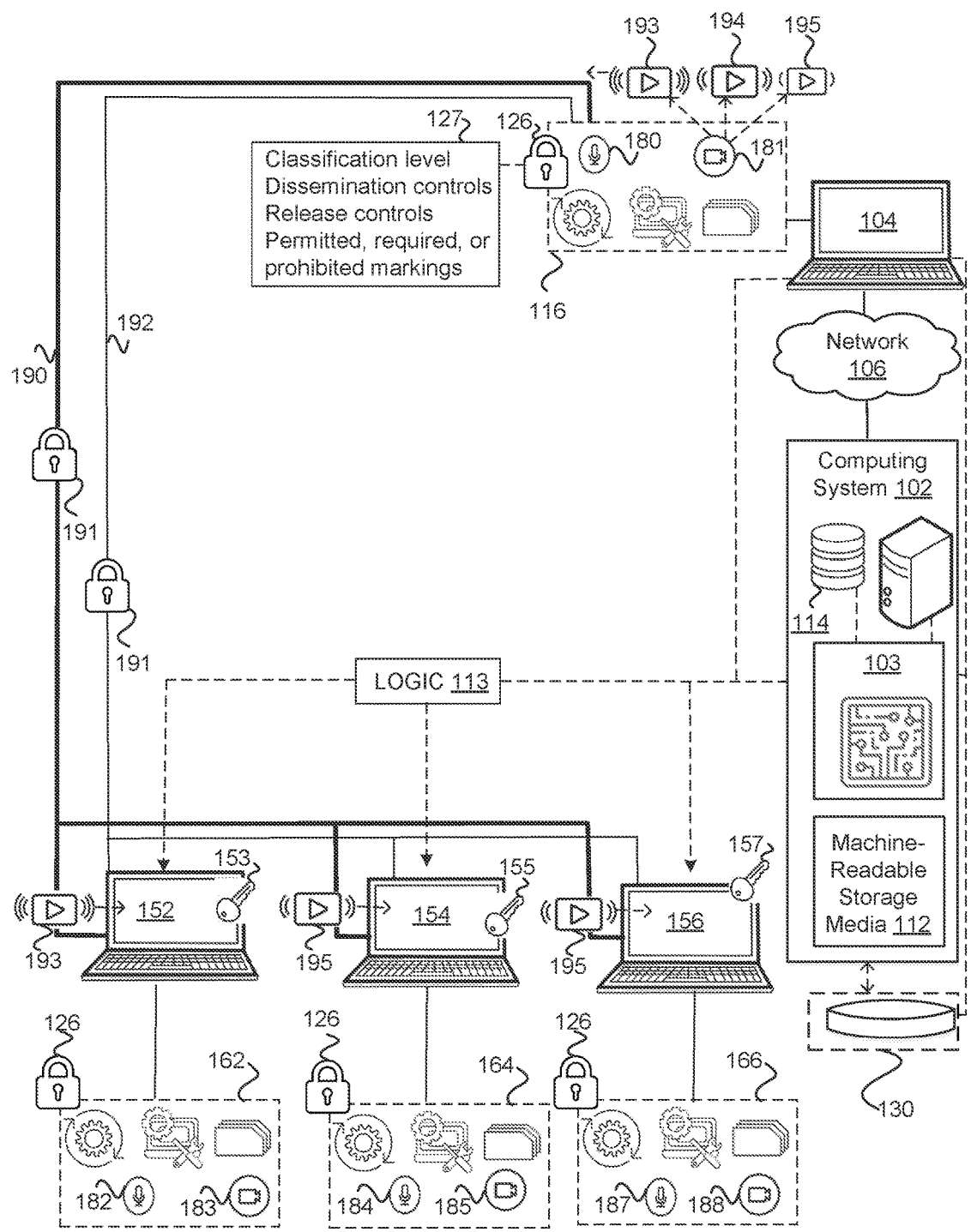

In FIG. 1C, the computing device 104 may generate a first video stream 193, a second video stream 194, and/or a third video stream 195, which have different levels of quality, as indicated by number or concentration of pixels and/or resolution. The logic 113 may transmit or propagate, or coordinate the transmission or propagation of, the first video stream 193, the second video stream 194, and the third video stream 195, along the audio or video communications channel 190. As illustrated in FIG. 1D, any of the first video stream 193, the second video stream 194, and the third video stream 195 may be modified and/or populated onto screens of each of the respective additional computing devices 152, 154, and 156, depending on attributes of the additional computing devices 152, 154, and 156, such as, what levels of quality each of the screens support. Specifically, in one example, one of the first video stream 193, the second video stream 194, and the third video stream 195 may be selected to be populated or displayed onto a screen of each of the respective additional computing devices 152, 154, and 156. In another example, one of the first video stream 193, the second video stream 194, and the third video stream 195 may be modified before being populated or displayed onto a screen of each of the respective additional computing devices 152, 154, and 156.

Figure 1E:
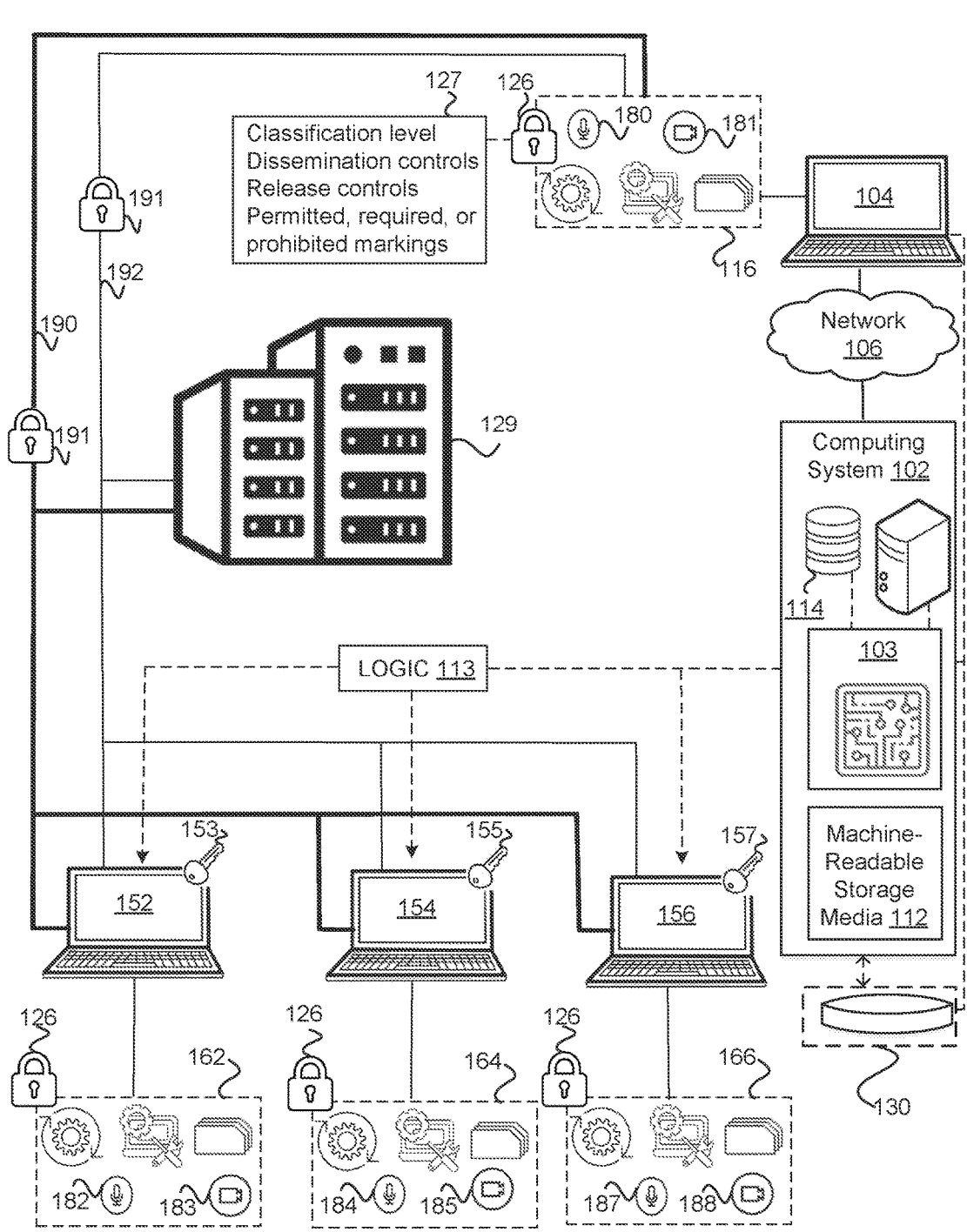

In FIG. 1E, the audio or video communications channel 190, and/or the tunnel 192, may be connected via one or more data centers 129. For example, the logic 113 may connect the audio or video communications channel 190, and/or the tunnel 192, to each of different computing devices (e.g., the computing device 104, and the additional computing devices 152, 154, and 156) involved in an audio or video call, to a particular data center, based on a proximity of each of the different computing devices to the particular data center. For example, the logic 113 may select the particular data center that has a minimum combined distance, compared to other data centers, to each of the different computing devices.

Figure 2A:
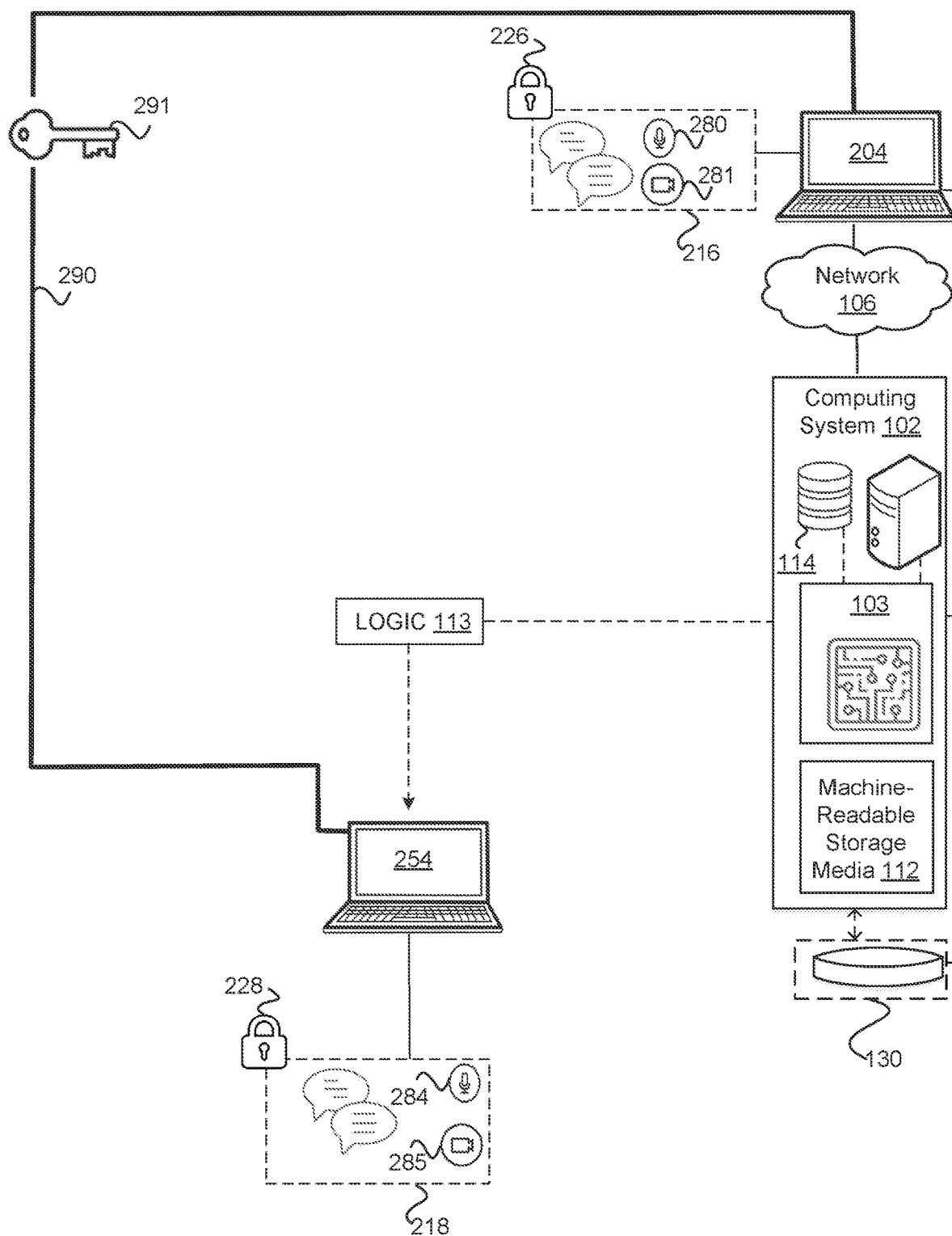
FIGS. 2A-2B illustrate an example implementation of a computing system that instantiates a video or audio communications channel, embedded within an application, artifact, or resource, across different instances of the application, artifact, or resource. The different instances may have or correspond to different access control characteristics.
Figure 2B:
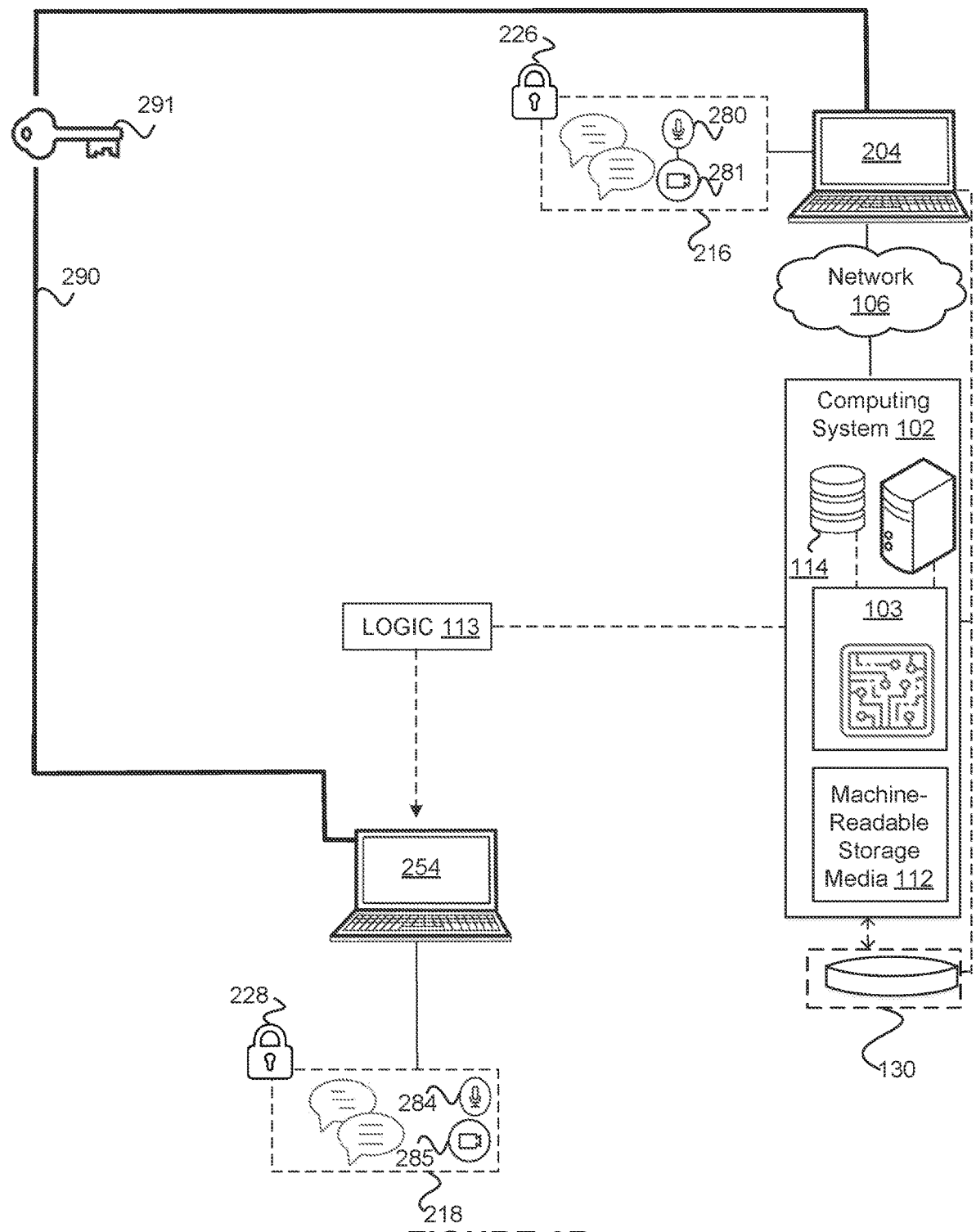

FIG. 2A illustrates in implementation in which computing devices 204 and 254 are accessing different instances 216 and 218 of a common resource. In some examples, the common resource may include a chat channel. The different instances 216 and 218, unlike in FIGS. 1A-1E, may have different access control characteristics 226 and 228, respectively. For example, the access control characteristics 226 may indicate "top secret," while the access control characteristics 228 may indicate "secret." In FIG. 2B, the logic 113 may instantiate an audio or video communications channel 290 embedded within the common resource. Access control characteristics 291 may be based on, or correspond to, any overlapping access control characteristics among the access control characteristics 226 and 228, a maximum level of access control characteristics shared among the access control characteristics subsumed or encompassed within, or that satisfy (e.g., equally or less restrictive than) any of the access control characteristics 226 or 228. For example, if the access control characteristics 226 indicate "top secret" while the access control characteristics 228 indicate "secret," then the access control characteristics 291 may indicate "secret" because "secret" forms an intersection between "top secret" and "secret." In other words, the access control characteristics 291 may indicate all shared access control characteristics that encompass both the access control characteristics 226 and 228, in this scenario, a lower classification level of the access control characteristics 226 and 228. As another example, if the access control characteristics 226 indicate "releasable to A and B" while the access control characteristics 228 indicate "releasable to A, B, and C," then the access control characteristics 291 may indicate "releasable to A, B, and C" because "releasable to A, B, and C" is a less restrictive or more permissive of the access control characteristics 226 and 228. In another example, if the access control characteristics 226 indicate "releasable to A" and the access control characteristics 228 indicate "releasable to B," then the access control characteristics 291 may indicate "releasable to A or B." In another example, if the access control characteristics 226 and 228 indicate different categories, such as the access control characteristics 226 indicating a classification level or restriction (e.g., "top secret") and the access control characteristics 228 indicating a release control (e.g., releasable to "A"), then the access control characteristics 291 may indicate "top secret" or "releasable to 'A'" Any relevant principles described in other FIGURES, for example, FIGS. 1A-1E, may be applicable to FIGS. 2A and 2B.

Figure 3:
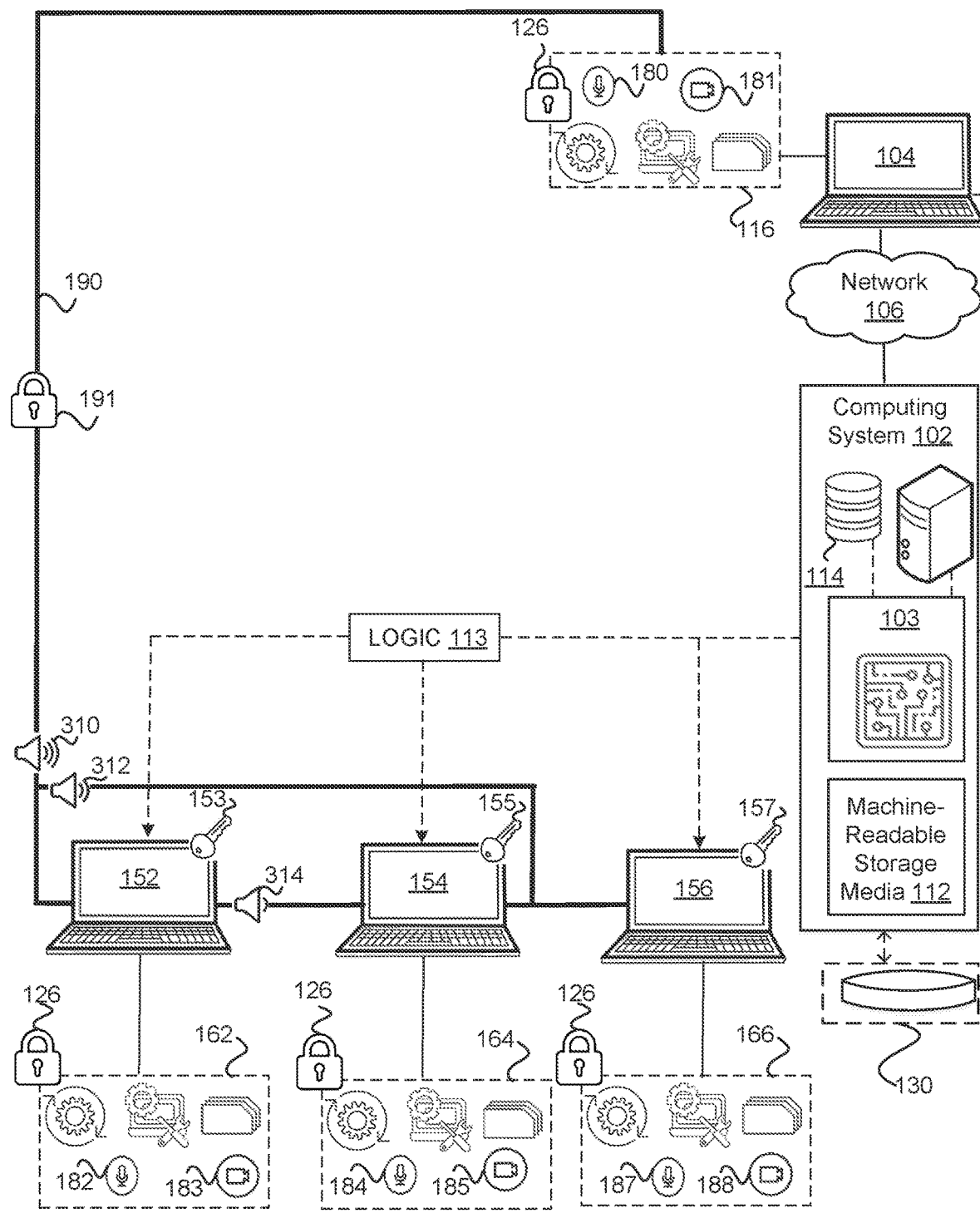
FIG. 3 illustrates an example implementation of a computing system that adjusts a volume of an audio or video call made over the video or audio communications channel.

FIG. 3 illustrates that any of the computing device 104 and the additional computing devices 152, 154, and 156 may adjust volumes of an audio or video stream, and/or of each received individual stream separately from any of the computing device 116 and the additional computing devices 152, 154, and 156. For example, the additional computing device 152 may receive audio and/or video streams individually, either simultaneously or at different times, through the audio or video communications channel 190 from the computing device 104 and/or from the additional computing devices 154 and 156. The additional computing device 152 may adjust, by itself or via the logic 113, respective volumes 310, 314, and 312 of the individual audio and/or video streams. Other computing devices 104, 154, and 156 may adjust respective volumes in a similar or same manner. In such a manner, each individual computing device may individually adjust volumes of different streams from different users, and/or adjust an overall stream volume. Therefore, each individual computing device may place or set an importance or priority of each received stream, for example, depending on an originating device or user, or depending on topic or content, thereby accentuating or emphasizing selective portions of a stream. This feature constitutes a technical effect of adjusting stream volumes on a granular, per stream basis in order to emphasize desired content while deemphasizing undesired content.

Figure 4:
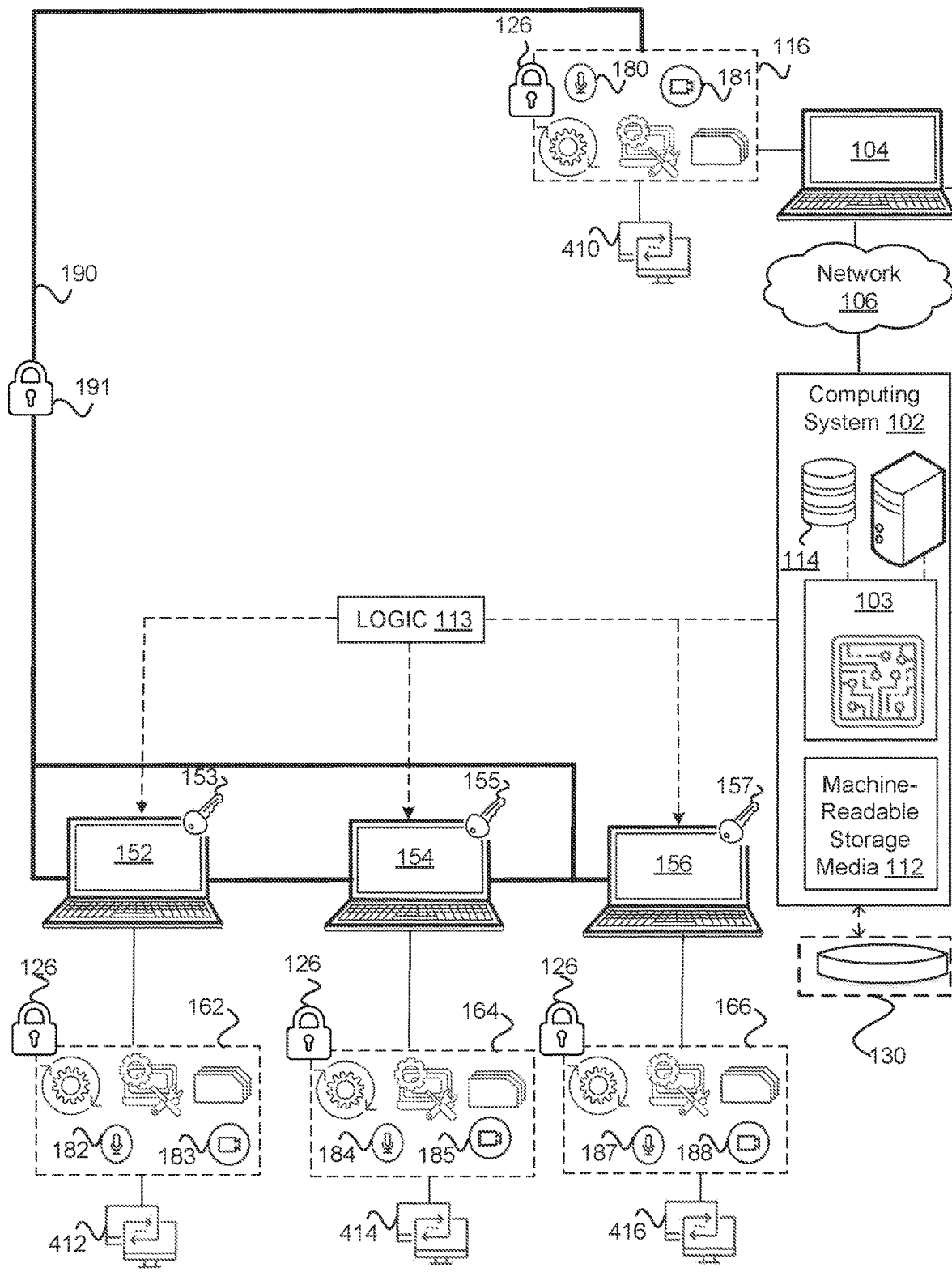
FIG. 4 illustrates an example implementation of a computing system that shares screens of one or more devices participating within the video or audio communications channel.

FIG. 4 illustrates a feature of screen sharing within the audio or video communications channel 190. For example, each of the computing device 104 and the additional computing devices 152, 154 and 156 may have screen sharing features 410, 412, 414, and 416, respectively, in which each of the computing device 104 and the additional computing devices 152, 154 and 156 may share a screen or a portion thereof with any or all of other computing devices participating in the audio or video communications channel 190. In some examples, the logic 113 may regulate content on screens of the computing device 104 and the additional computing devices 152, 154 and 156 by recognizing whether certain content, such as images or text, exceed or violate the access control characteristics 191. If so, the logic 113 may redact or otherwise prevent or refrain from displaying such content. Such a feature encompasses a technical effect by providing an extra layer of access control regulations.

Figure 5:
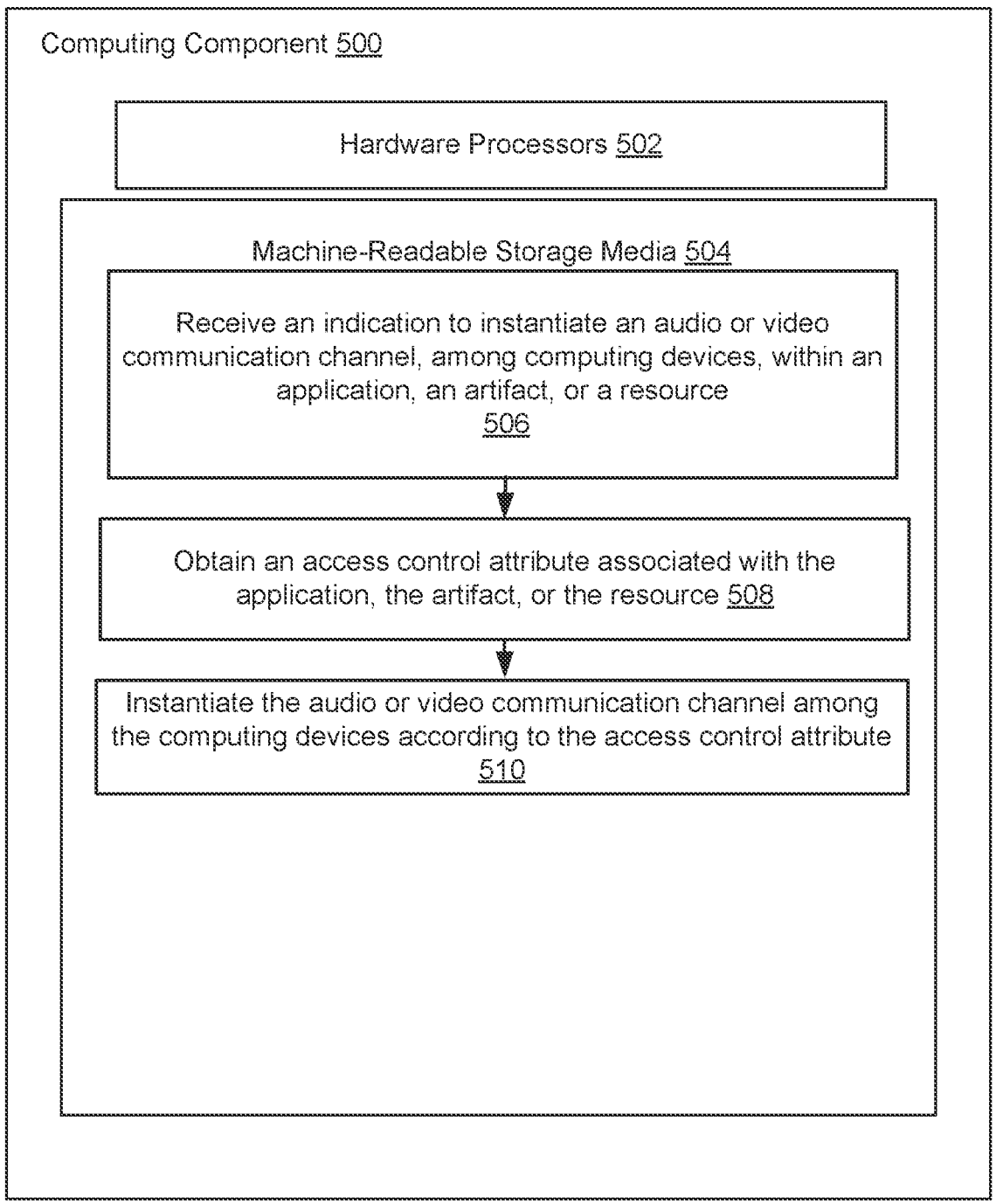
FIG. 5 illustrates a flowchart of an example method consistent with FIGS. 1A-1E, 2A-2B, 3, and 4, embodied in a computing component.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of monitoring and/or initiating of downstream actions. The computing component 500 may be implemented as the computing system 102 of FIGS. 1A-1E, 2A-2B, and 3-4. The hardware processors 502 may be implemented as the processors 103 of FIGS. 1A-1E, 2A-2B, and 3-4. The machine-readable storage media 504 may be implemented as the machine-readable storage media 112 of FIGS. 1A-1E, 2A-2B, and 3-4, and may include suitable machine-readable storage media described in FIG. 6.

At step 506, the hardware processor(s) 502 may execute machine-readable/machine-executable instructions stored in the machine-readable storage media 504 to receive an indication to instantiate an audio or video communication channel, among computing devices, within an application, an artifact, or a resource (hereinafter "resource"). In some examples, the indication may be received from a computing device (e.g., the computing device 104). In other examples, the hardware processor(s) 502 may receive an indication to instantiate, when certain conditions are satisfied (e.g., a threshold number of computing devices collaborating on instances of a common resource, a threshold frequency of access or modifications on the common resource, and/or a threshold amount of data accessed or transferred within the common resource). At step 508, the hardware processor(s) 502 may execute machine-readable/machine-executable instructions stored in the machine-readable storage media 504 to obtain an access control attribute associated with the application, the artifact, or the resource. This access control attribute may include any or all of a classification level, releasability control, dissemination control, and any other access restrictions. At step 510, the hardware processor(s) 502 may execute machine-readable/machine-executable instructions stored in the machine-readable storage media 504 to instantiate the audio or video communication channel among the computing devices according to the access control attribute, as described, for example, in FIGS. 1A-1E and 2A-2B. Additionally, the hardware processor(s) 502 may retain call data for knowledge management and/or semantic searching (e.g., keyword queries), link audio and/or video communications calls to calendars, and/or integrate the audio and/or video communications calls with telephone calls.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 6:
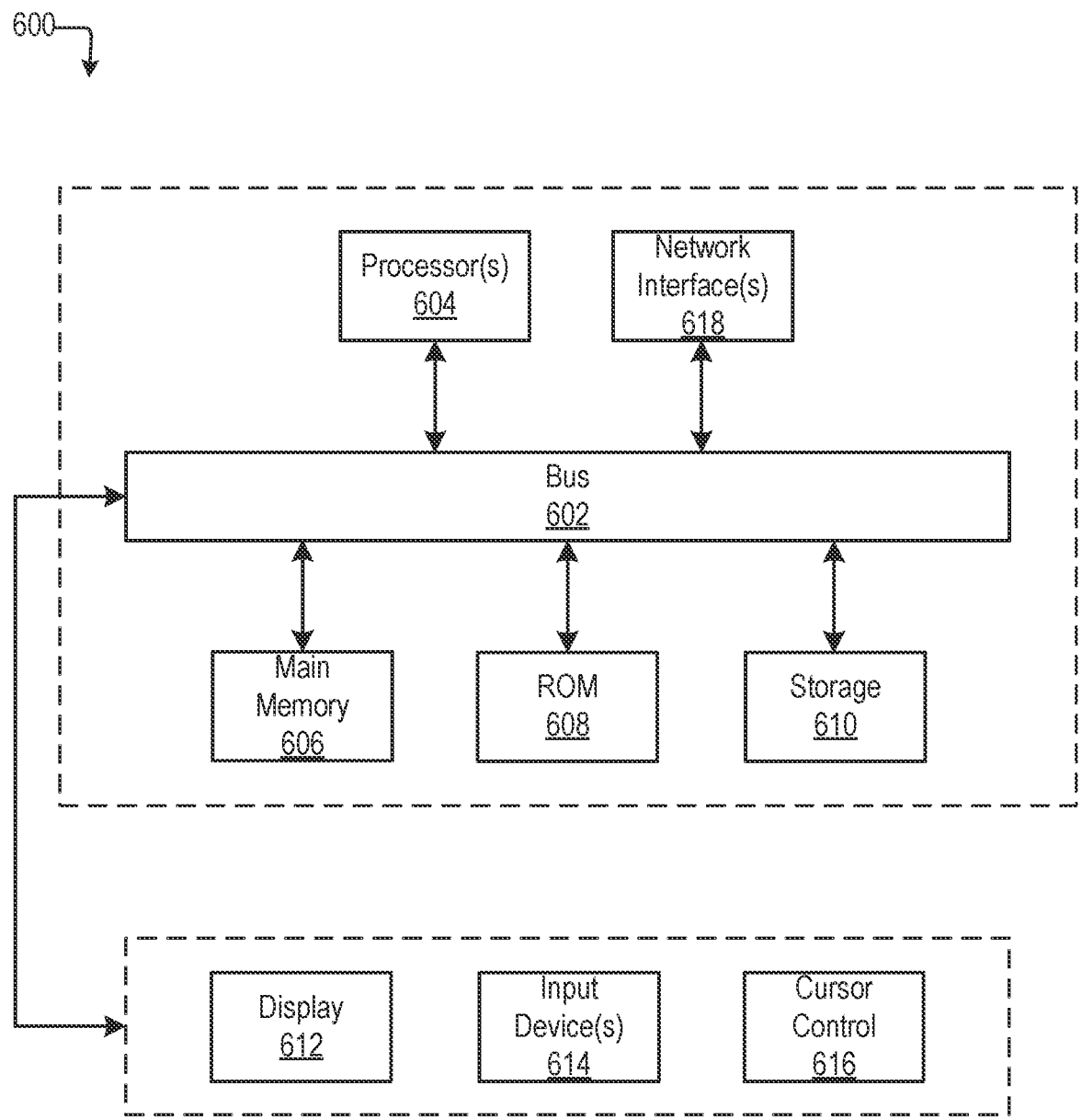
FIG. 6 illustrates a block diagram of an example computer system in which any of the embodiments described herein may be implemented.

FIG. 6 is a block diagram that illustrates a computer system 600 upon which any of the embodiments described herein may be implemented. In some examples, the computer system 600 may include a cloud-based or remote computing system. For example, the computer system 600 may include a cluster of machines orchestrated as a parallel processing infrastructure. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A system comprising:
one or more processors; and
a memory storing instructions that, when executed by the one or more processors, cause the system to perform;
instantiating a collaborative application, artifact, or resource accessible by computing devices;
performing one or more collaborative actions within the collaborative application, artifact, or resource, wherein one or more results of the collaborative actions are shared among the computing devices;
receiving an indication to embed an audio or video communication channel, among computing devices, embedded within the collaborative application, an artifact, or a resource, wherein the application, the artifact, or the resource comprises a different type of application, artifact, or resource, compared to the audio or video communication channel;
obtaining an access control attribute associated with the application, the artifact, or the resource;
embedding the audio or video communication channel within the collaborative application, artifact, or resource according to the access control attribute; and
in response to failure of the audio or video communication channel, activating or deploying one or more tunnels according to the access control attribute as a backup communication path.

2. The system of claim 1, wherein the access control attribute comprises a first access control attribute, and the instantiating of the audio or video communication channel comprises embedding the audio or video communication channel within the application, the artifact, or the resource across different instances of the application, the artifact, or the resource, and setting a second access control attribute corresponding to the audio or video communication channel to match the first access control attribute.

3. The system of claim 1, wherein the instantiating of the audio or video communication channel comprises embedding the audio or video communication channel within the application, the artifact, or the resource across different instances of the application, the artifact, or the resource, and setting a second access control attribute corresponding to the audio or video communication channel according to an intersection among different access control attributes of the respective different instances.

4. The system of claim 3, wherein the setting of the second access control attribute corresponding to the audio or video communication channel is according to a maximum access control attribute that is equally or less restrictive compared to each of the different access control attributes of the respective different instances.

5. The system of claim 4, wherein the application, the artifact, or the resource comprises a chat channel.

6. The system of claim 2, wherein the different instances are deployed across different servers, and the instantiation of the audio or video communication channel is across the different servers.

7. The system of claim 1, wherein the instructions that, when executed by the one or more processors, further cause the system to perform:
sharing respective screens of one or more of the computing devices to other computing devices within the audio or video communication channel.

8. A method comprising:
instantiating a collaborative application, artifact, or resource accessible by computing devices:
performing one or more collaborative actions within the collaborative application, artifact, or resource, wherein one or more results of the collaborative actions are shared among the computing devices;
receiving an indication to embed an audio or video communication channel, among computing devices, embedded within the collaborative application, an artifact, or a resource, wherein the application, the artifact, or the resource comprises a different type of application, artifact, or resource, compared to the audio or video communication channel;
obtaining an access control attribute associated with the application, the artifact, or the resource;

embedding the audio or video communication channel within the collaborative application, artifact, or resource according to the access control attribute; and in response to failure of the audio or video communication channel, activating or deploying one or more tunnels according to the access control attribute as a backup communication path.

9. The method of claim 8, wherein the access control attribute comprises a first access control attribute, and the instantiating of the audio or video communication channel comprises embedding the audio or video communication channel within the application, the artifact, or the resource across different instances of the application, the artifact, or the resource, and setting a second access control attribute corresponding to the audio or video communication channel to match the first access control attribute.

10. The method of claim 8, wherein the instantiating of the audio or video communication channel comprises embedding the audio or video communication channel within the application, the artifact, or the resource across different instances of the application, the artifact, or the resource, and setting a second access control attribute corresponding to the audio or video communication channel according to an intersection among different access control attributes of the respective different instances.

11. The method of claim 10, wherein the setting of the second access control attribute corresponding to the audio or video communication channel is according to a maximum access control attribute that is equally or less restrictive compared to each of the different access control attributes of the respective different instances.

12. The method of claim 11, wherein the application, the artifact, or the resource comprises a chat channel.

13. The method of claim 9, wherein the different instances are deployed across different servers, and the instantiation of the audio or video communication channel is across the different servers.

14. A non-transitory computer-readable storage medium including instructions that, when executed by at least one processor of a computing system cause the computing system to perform operations comprising:

instantiating a collaborative application, artifact, or resource accessible by computing devices;

performing one or more collaborative actions within the collaborative application, artifact, or resource, wherein one or more results of the collaborative actions are shared among the computing devices;

receiving an indication to embed an audio or video communication channel, among computing devices, embedded within the collaborative application, an artifact, or a resource, wherein the application, the artifact, or the resource comprises a different type of application, artifact, or resource, compared to the audio or video communication channel;

obtaining an access control attribute associated with the application, the artifact, or the resource;

embedding the audio or video communication channel within the collaborative application, artifact, or resource according to the access control attribute; and in response to failure of the audio or video communication channel, activating or deploying one or more tunnels according to the access control attribute as a backup communication path.

15. The non-transitory computer-readable storage medium of claim 14, wherein the access control attribute comprises a first access control attribute, and the instantiating of the audio or video communication channel comprises embedding the audio or video communication channel within the application, the artifact, or the resource across different instances of the application, the artifact, or the resource, and setting a second access control attribute corresponding to the audio or video communication channel to match the first access control attribute.

16. The system of claim 1, wherein the application, the artifact, or the resource comprises a data analysis resource, a data storage resource, a data visualization resource, or a geospatial related resource.

17. The system of claim 1, wherein the audio or video communication channel comprises multiple layers, wherein each of the multiple layers correspond to different resolutions or bitrates; and the instructions that, when executed by the one or more processors, cause the system to perform instantiating a single video stream according to the different resolutions or bitrates.

18. The system of claim 1, wherein embedding the audio or video communication channel within the collaborative application, artifact, or resource is subject to one or more one or more conditions.

19. The system of claim 18, wherein the one or more conditions comprise a threshold number of computing devices collaborating on instances of a common resource, a threshold frequency of access or modifications on the common resource, and a threshold amount of data accessed or transferred within the common resource.

* * * * *